UNITED STATES PATENT OFFICE.

MELCHIOR BÖNIGER, OF BASLE, SWITZERLAND, ASSIGNOR TO THE FIRM OF CHEMICAL WORKS FORMERLY SANDOZ, OF SAME PLACE.

BLACK SULFUR DYE AND PROCESS OF MAKING SAME.

SPECIFICATION forming part of Letters Patent No. 675,585, dated June 4, 1901.

Application filed January 29, 1901. Serial No. 45,224. (Specimens.)

*To all whom it may concern:*

Be it known that I, MELCHIOR BÖNIGER, doctor of philosophy, residing at Fabrikstrasse 116, Basle, Switzerland, have invented new and useful Improvements in Black Sulfur Dyes and Processes of Making Same, (for which Letters Patent have been applied for in Germany, C. 9,344, dated October 11, 1900; in England, No. 18,533, dated October 17, 1900, and in France, No. 292,687, dated October 8, 1900,) of which the following is a specification.

I have discovered that in the molecule of the 1.4 chlornitronaphthalene, its nitro and sulfo derivatives, the chlorin atom may easily be substituted by an amido or alphylamido group. By allowing paraämidophenol or paraamidophenol-orthosulfonic acid to react upon 1.4 chlornitronaphthalene bodies, preferably in presence of salts of a weakly-alkaline reaction, new paraoxyphenyl 1.4 nitronaphthylamin compounds are formed, which by treatment with sulfur and sulfids of alkali yield most valuable new sulfur dyes capable of dyeing unmordanted cotton from an alkaline-sulfid bath in blue-black to deep-black shades remarkably fast to washing, light, and the action of acids and alkalies. The condensation of the 1.4 chlornitronaphthalene, the 1.4.5 and the 1.4.8 chlordinitronaphthalene with the paraämidophenol and its sulfonic acid may preferably be carried out in spirit solution, either in boiling on the reflux-condenser or in order to accelerate the reaction by heating in closed vessels to about 120° to 150° centigrade in presence of acetate of soda or carbonate of calcium. The sulfonated derivatives of the 1.4 chlornitronaphthalene react very easily by boiling molecular proportions of the components in aqueous solution for several hours in presence of acetate of soda or carbonate of calcium.

The new phenylalphanaphthylamin derivatives formed by the above-described substitution of the chlorin atom by the paraoxyphenyl group and yielding blue-black to black sulfur dyes contain as general characteristic the nucleus

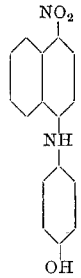

whereby in the naphthalene group a hydrogen atom may be substituted either by a sulfo group or a second nitro group and in the benzene group by a sulfo group in the ortho position with respect to the hydroxyl group. The presence of a nitro group in the benzene group, however, would change the shade of the corresponding sulfur dye into brown.

In carrying out my invention practically I can proceed as follows:

Example I. Twenty-five kilos of 1.4.8 chlordinitronaphthalene, ten kilos of paraämidophenol, and nine kilos of dry acetate of soda are dissolved in one hundred kilos of spirit and boiled on the reflux-condenser until the chlordinitronaphthalene has practically disappeared. The intense-brown-yellow-colored solution thus obtained is then poured into water acidulated with hydrochloric acid, whereby the product of condensation is precipitated in brown-red flakes. It may be purified by dissolving it in dilute cold soda-lye, whereby an intense-brown solution is obtained, which after filtration is precipitated by addition of acids in microcrystalline brown-red needles, easily soluble in spirit, methyl alcohol, glacial acetic acid, and nearly insoluble, however, in water, benzene, and toluene.

In the foregoing example 1.4 chlornitronaphthalene or 1.4.5 chlordinitronaphthalene may be employed as equivalents of the 1.4.8 chlordinitronaphthalene paraämidophenol-sulfonic acid in the place of paraämidophenol.

Example II. A solution of sixty-three kilos of the soda salt of 1.4.6 chlornitronaphthalenesulfonic acid and twenty kilos of paraämidophenol in five hundred liters of water is boiled under addition of fifteen kilos of carbonate of calcium during eight to twelve hours in the reflux apparatus. The new paraoxyphenyl 1.4 nitronaphthylaminsulfonic acid hereby formed can be isolated in precipitating first the carbonate of calcium with Solvay soda, filtering afterward, and precipitating the intense-brown-yellow solution by a mineral acid under addition of common salt. The brown resinous precipitation thus obtained is dried and now ready for the melt with sodium sulfid and sulfur. Similar paraoxyphenyl 1.4 nitronaphthylaminsulfonic acids are formed in substituting the 1.4 chlornitronaphthalenesulfonic acid by isomeric sulfonic acids—as, for instance, the 1.4.7 chlornitronaphthalenesulfonic acid, &c. They are very easily soluble in water with brown-yellow color, turning by the addition of alkalies into brown-red.

Example III. Sixty kilos of the paraoxyphenyl 4.8.1 dinitronaphthylamin (Example I) are slowly introduced in a mixture of one hundred and eighty kilos of crystallized sodium sulfid and sixty kilos of sulfur, heated in an iron vessel provided with a stirring arrangement at 110° to 120° centigrade. The temperature is then raised first to 130°, whereby an intermediate product is formed by reduction of the nitro groups. As soon as a sample of the melt dissolves in water no more with brown but with weakly blue-violet color the temperature is slowly raised to from 150° to 160° centigrade and maintained thereat until the formation of the dyestuff does no more increase and the melt has become dry. It can directly be powdered and used in this form for dyeing.

The new coloring-matter is a black powder easily soluble in water with black color, which is not altered by caustic soda, but gives, however, a brown-black precipitate by the addition of acids. It is practically insoluble in spirit and dissolves but sparingly in strong sulfuric acid with a blue-black color. It dyes unmordanted cotton from an alkaline salt-bath containing sodium sulfid a deep fast black without the help of oxidizing agents.

Similar dyestuffs are obtained by substituting the paraoxyphenyl 4.8.1 dinitronaphthylamin by the isomeric paraoxy 4.5.1 dinitronaphthylamin or the paraoxyphenyl 1.4 nitronaphthylamin or in using mixtures of these three bodies, whereas the sulfonic acids thereof yield in direct dyeing more greenish-black shades, turning by following oxidation on the fiber into blue-black.

Example IV: Two hundred kilos of sodium sulfid, sixty-seven kilos of sulfur, and fifty kilos of water are heated in an iron vessel provided with a stirring arrangement in an oil-bath up to 110°, and one hundred kilos of paraoxyphenyl 4.1.6 or 4.1.7 nitronaphthylaminsulfonic acid are slowly added thereto. The temperature is then brought first to 120° centigrade and maintained thereat until a sample gives no more a yellow but a slightly-greenish solution with water. Now the temperature in the oil-bath is raised to 160° centigrade, whereby the temperature of the melt shall not pass over 130° to 135° centigrade. Stirring is continued all the time until the mass becomes thick and a sample proves that the formation of dyestuff does no more increase. The mass is now dissolved in water, and the dyestuff is precipitated by common salt while introducing a current of air through the solution. The grayish-black precipitate thus obtained is filtered, pressed, and dried. It is insoluble in spirit and dissolves in water containing sodium sulfid with blue-black and in strong sulfuric acid with a dark-blue color.

From a salt-bath containing sodium sulfid the new coloring-matter dyes greenish blue-black shades, turning by following oxidation with bichromate and sulfuric acid into very valuable dark-blue tints of great fastness to acids, alkalies, and the action of light.

It may be stated that in my process the nitro compounds used in the sulfur melt may be substituted by the corresponding products of reduction—i. e., nitroamido or amido compounds—and also the quantities of the agents and the temperature of the reaction may be altered within some limits. The sodium sulfid and sulfur used in the foregoing examples can be replaced by other alkaline sulfid-carrying compounds, such as sulfur and potassium sulfid, sodium or potassium polysulfid, or the like.

Now what I claim, and desire to secure by Letters Patent, is the following:

1. The process herein described for the manufacture of black sulfur dyes, consisting in heating together paraoxyphenyl 1.4 nitronaphthylamin substances and alkali sulfid and sulfur.

2. As new articles of manufacture the new blue-black to black sulfur dyes deriving from the paraoxyphenyl 1.4 nitronaphthylamin bodies hereinbefore described by the action of alkaline sulfid-carrying compounds, forming black powders dissolving in water in presence of alkali sulfids with a black, in concentrated sulfuric acid but sparingly with a blue-black color, insoluble in spirit and dyeing cotton in a salt-bath containing alkali sulfid in blue-black to black shades.

3. As a new article of manufacture the specific sulfur dye, deriving from paraoxyphenyl 1.4 nitronaphthylaminsulfonic acid by the action of alkaline sulfid-carrying compounds at 115° to 135° centigrade forming a grayish-black powder, insoluble in spirit, dissolving in water containing alkali sulfid with a blue-black, in strong sulfuric acid with a dark-blue color, dyeing unmordanted cotton from a salt-bath containing alkali sulfid directly in greenish blue-black shades, being changed by treatment with oxidizing agents into a most valuable dark blue, fast to washing, to acids and to the action of light.

In testimony whereof I have signed my name to this specification in the presence of two subscribing witnesses.

MELCHIOR BÖNIGER.

Witnesses:
ALBERT GRAETER,
ARNOLD STEINER.